US007868486B2

(12) United States Patent  
Lanni

(10) Patent No.: US 7,868,486 B2  
(45) Date of Patent: Jan. 11, 2011

(54) POWER SUPPLY HAVING SOURCE DETERMINATION CIRCUITRY UTILIZED TO DISABLE BATTERY CHARGING CIRCUITRY IN POWERED DEVICE

(75) Inventor: Thomas W. Lanni, Laguna Niguel, CA (US)

(73) Assignee: Comarco Wireless Technologies, Inc, Lake Forest, CA (US)

( * ) Notice: Subject to any disclaimer, the term of this patent is extended or adjusted under 35 U.S.C. 154(b) by 776 days.

(21) Appl. No.: 11/604,950

(22) Filed: Nov. 28, 2006

(65) Prior Publication Data

US 2007/0073420 A1    Mar. 29, 2007

Related U.S. Application Data

(63) Continuation-in-part of application No. 10/758,933, filed on Jan. 15, 2004, now Pat. No. 7,453,171.

(51) Int. Cl.  
G05B 15/00    (2006.01)

(52) U.S. Cl. .............................. 307/151; 700/22; 307/80

(58) Field of Classification Search .................. 307/80, 307/28, 31, 151; 713/322, 300, 310, 320, 713/340; 715/700, 716; 345/156; 323/313; 320/132, 138; 700/22

See application file for complete search history.

(56) References Cited

U.S. PATENT DOCUMENTS

| 5,955,797 | A  | * | 9/1999  | Kim ............................ 307/150 |
| 5,969,438 | A  |   | 10/1999 | Odaohara et al. ............. 307/80   |
| 6,288,522 | B1 |   | 9/2001  | Odaohhara et al. .......... 320/138    |
| 6,459,175 | B1 | * | 10/2002 | Potega ......................... 307/149 |
| 6,528,970 | B1 |   | 3/2003  | Liu et al. .................... 320/107  |
| 6,567,565 | B1 |   | 5/2003  | Klassen ...................... 361/679   |
| 6,795,302 | B2 |   | 9/2004  | Kluth et al. ................. 361/679   |
| 6,903,950 | B2 |   | 6/2005  | Afzal et al. ................. 363/142   |
| 7,039,821 | B1 | * | 5/2006  | Potega ........................ 713/340   |

(Continued)

FOREIGN PATENT DOCUMENTS

WO        WO 98/19223        5/1998

(Continued)

OTHER PUBLICATIONS

European Search Report dated Feb. 6, 2009 for European Patent Application No. 07254497.6, 13 pages.

(Continued)

*Primary Examiner*—Jared J Fureman  
*Assistant Examiner*—Daniel Cavallari  
(74) *Attorney, Agent, or Firm*—Pillsbury Winthrop Shaw Pittman LLP

(57) ABSTRACT

A power supply provides a DC voltage to power an electronic device which includes battery charging circuitry. The power supply can be selectably coupled to alternative types of power sources and converts the power received from a power source to the DC voltage. The power supply includes source determination circuitry which generates a signal indicative of the type of power source to which the power supply is coupled. The DC voltage and the power source indication signal are provided to the electronic device. In response to the power source indication signal, a controller within the electronic device controls the amount of power drawn by the device by disabling the battery charging circuitry.

7 Claims, 14 Drawing Sheets

U.S. PATENT DOCUMENTS

| | | | |
|---|---|---|---|
| 7,127,623 B2 * | 10/2006 | Potega | 713/300 |
| 2002/0171980 A1 * | 11/2002 | Tsukihashi | 360/220 |
| 2005/0127758 A1 * | 6/2005 | Atkinson et al. | 307/80 |
| 2005/0162020 A1 | 7/2005 | Lanni | |
| 2006/0164061 A1 | 7/2006 | Formenti et al. | |
| 2006/0220465 A1 | 10/2006 | Kingsmore et al. | |

FOREIGN PATENT DOCUMENTS

| | | |
|---|---|---|
| WO | WO 2006/116298 A1 | 11/2006 |

OTHER PUBLICATIONS

European Search Report dated Sep. 19, 2006 for corresponding EP patent application No. EP 05 25 0133.

* cited by examiner

POWER SUPPLY HAVING SOURCE DETERMINATION CIRCUITRY UTILIZED TO DISABLE BATTERY CHARGING CIRCUITRY IN POWERED DEVICE

RELATED APPLICATIONS

This application is a continuation-in-part of application Ser. No. 10/758,933, filed Jan. 15, 2004, now U.S. Pat. No. 7,453,171.

BACKGROUND OF THE INVENTION

1. Technical Field

This invention relates to DC power adapters used to power electronic devices.

2. Description of the Related Arts

There are power systems in the art which allow a user to hook up a DC/DC adapter to an automobile outlet, to supply regulated DC power to power an electronic device, such as a notebook computer. Automobile outlets typically provide a DC voltage in a range between 11.0 and 14.1 Volts. Some power systems also allow the user to hook up the DC/DC adapter to an airplane output such as the EMPOWER system. EMPOWER typically provides a DC voltage in a range between 14.5 and 15.5 Volts.

Accordingly, some DC/DC adapters can be used with both an automobile outlet and the EMPOWER system to provide a regulated DC power to the electronic device such as the notebook computer. Notebook computers often contain lithium ion batteries. Such batteries can be recharged when the notebook computer is hooked up to the DC/DC adapter. For example, if the user is in a car, the user can couple a DC/DC adapter to the notebook computer and to the cigarette lighter outlet to power the notebook computer. The batteries in the notebook computer will draw some of the DC power supplied to recharge the batteries of the notebook computer if they are low in power. Accordingly, the user can simultaneously use the notebook computer and recharge the batteries therein.

The user can also use the DC/DC adapter while on an airplane, by plugging the DC/DC adapter into the EMPOWER outlet. The EMPOWER outlet and the automobile outlets have different sizes and shapes. Accordingly, the user can directly plug the DC/DC adapter into the EMPOWER outlet, and can place a connector over the EMPOWER plug of the DC/DC adapter and then plug the connector into the automobile cigarette lighter outlet. When the user hooks the DC/DC adapter up to the EMPOWER outlet and then to the electronic device, the electronic device receives the regulated DC power. However, if the charging circuitry in the battery malfunctions, the battery can overheat or even catch on fire when recharging from an EMPOWER DC source. If the battery were to catch on fire while an airplane in which the emPlower outlet is located is flying, the fire would have the potential to cause the airplane to crash or cause substantial damage.

To address this problem, one system in the art provides a connector to connect between the DC/DC adapter and the notebook computer to inform the notebook computer not to recharge the batteries. FIG. 1 illustrates a power supply system according to the prior art. As shown a DC power source 100 is coupled to a DC/DC adapter 105 via a cable 102. The DC/DC adapter 105 receives power from the DC power source 100 and outputs regulated DC power to an electronic device 120, via a cable 110 and a connector 115 coupled to the end of the cable 110.

The DC/DC adapter 105 can provide three output pins to the electronic device 120, as shown in FIGS. 2A and 2B of the prior art. The first pin can provide the output voltage (i.e., $V_{out}$), the second pin can provide a ground reference (i.e., GND), and the third pin can provide a data line (i.e., $V_{data}$) to instruct the notebook as to whether the batteries should be recharged or not. For example, as shown in FIG. 2A, $V_{data}$ could be tied to GND to indicate that the DC power source 100 is the EMPOWER system and therefore the battery should not be recharged. Alternatively, as shown in FIG. 2B, $V_{data}$ could also be left open (i.e., to provide a non-grounded floating voltage) when the DC power source 100 in a cigarette lighter outlet of an automobile. Accordingly, when using the DC/DC adapter 105 while in an automobile, the user would use a connector 115 having the $V_{data}$ line floating, and when using the DC/DC adapter 105 with the EMPOWER system of an airplane, the user would use a connector 115 having the $V_{data}$ line tied to GND.

However, problems arise when the user forgets to change the connector 115 for use with the automobile when the user is in an airplane. Accordingly, if the user has the wrong connector 115 attached when using with the EMPOWER system, a battery of an electronic device 120 such as a notebook computer can charge the battery even when used with the EMPOWER system, and if the charging circuitry of the battery malfunctions, overheating or even a fire can occur, resulting in damage to the notebook computer. Also, if the connector 115 is damaged or flawed, then it may not provide the correct Vdata signal to the notebook computer, allowing the notebook computer to recharge the batteries in an airplane when they shouldn't be allowed to do so.

Accordingly, current DC/DC power adapter systems are deficient because they are incapable of automatically and intelligently informing an electronic device 120 coupled thereto of the DC power source (i.e., the EMPOWER system or an automobile cigarette lighter outlet).

DETAILED DESCRIPTION

An embodiment of the present invention is directed to a power supply system to determine a DC power source (e.g., an automobile cigarette lighter outlet or an EMPOWER airplane outlet) coupled thereto and send a signal indicative of the power source to an electronic device coupled thereto. The electronic device may be a notebook computer or other portable consumer electronic device, for example. Based on the signal sent to the electronic device, the electronic device may control the amount of power drawn to prevent overheating. For example, when a notebook computer is hooked up and the power source is the EMPOWER system, the electronic device may disable charging of the internal batteries of the notebook computer, in order to prevent damage or overheating of the batteries due to malfunction or failure. The DC power source may be determined by voltage comparison circuitry, such as a comparator, or by a voltage comparison device including a processor.

Figure 1:
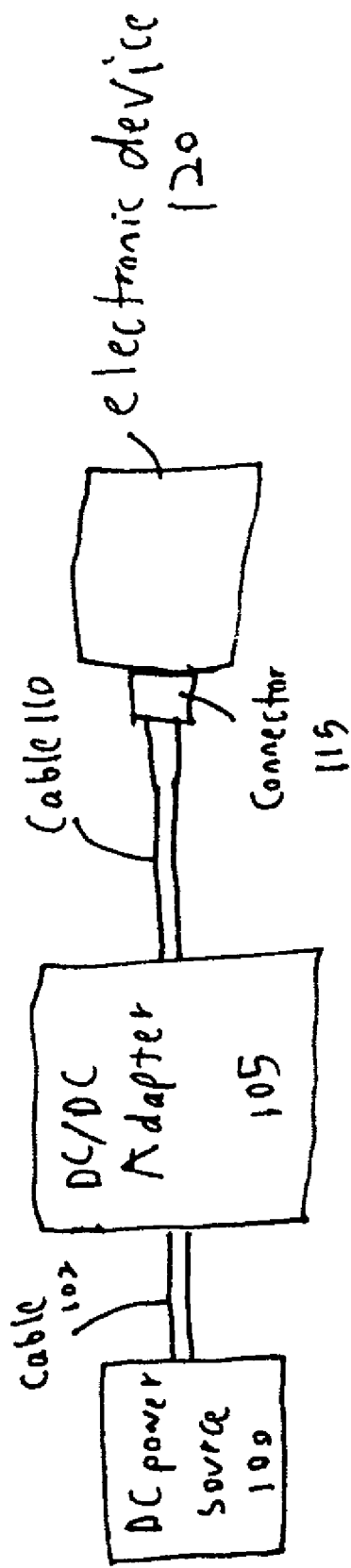
FIG. 1 illustrates a power supply system according to the prior art.
Figure 2A:
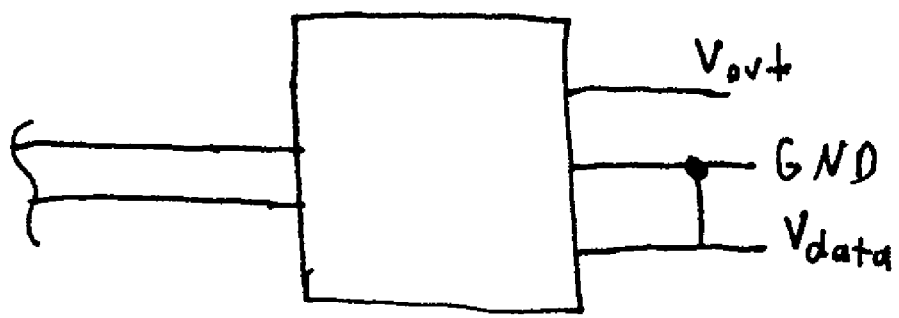
FIG. 2A illustrates a first connector to coupled a power supply system to an electronic device according to the prior art.
Figure 2B:
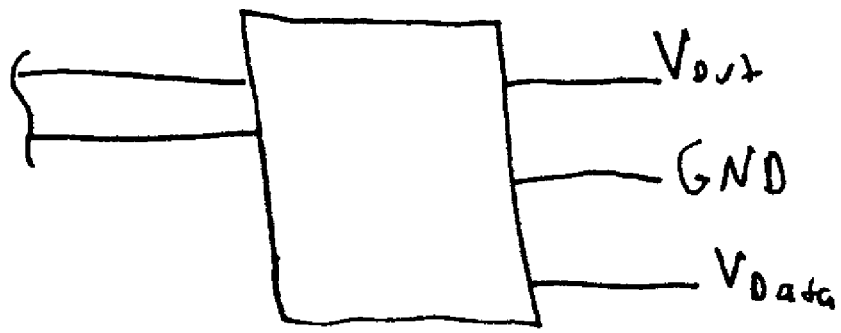
FIG. 2B illustrates a second connector to coupled a power supply system to an electronic device according to the prior art.
Figure 3:
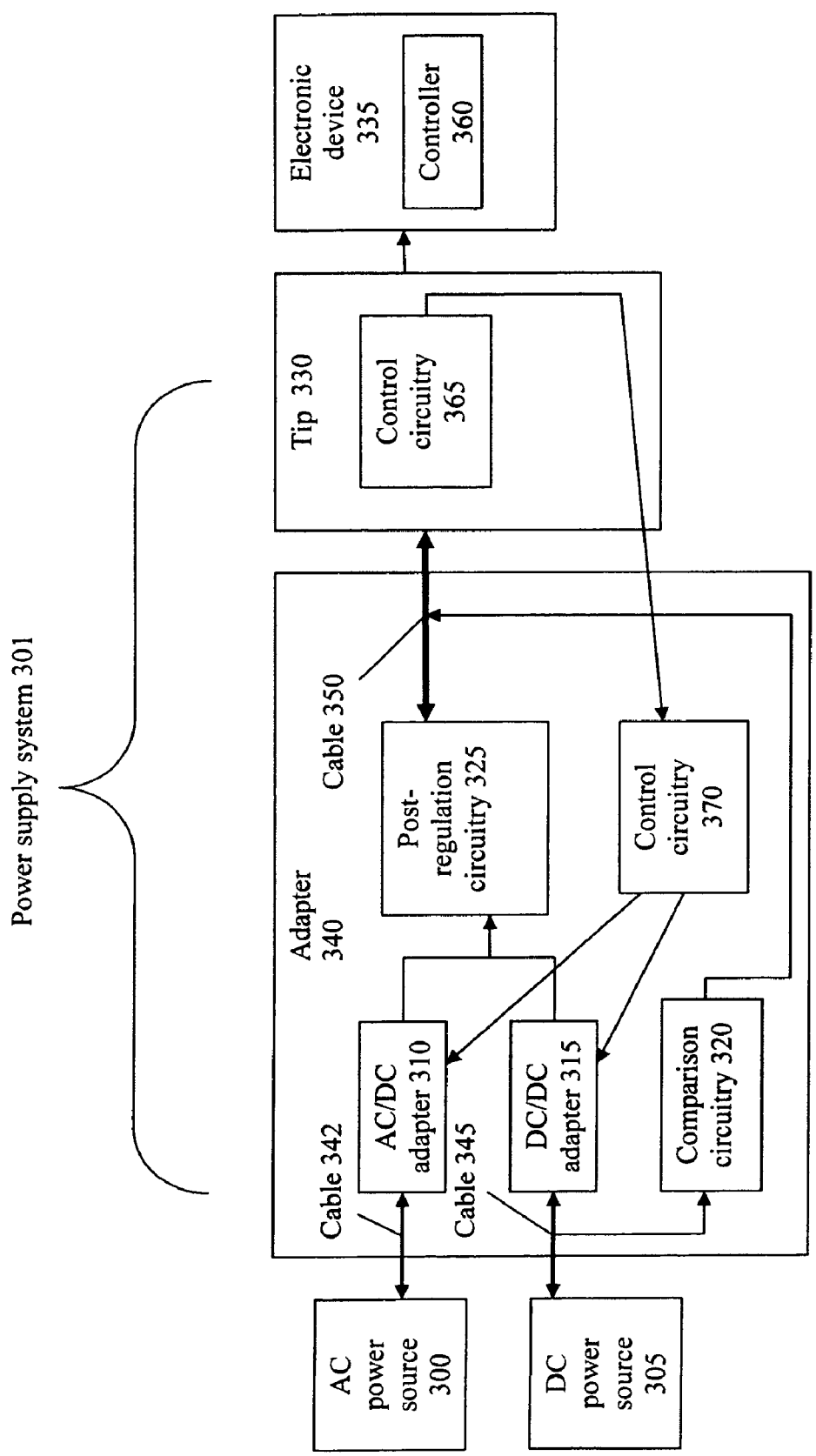
FIG. 3 illustrates a power supply system according to an embodiment of the invention.

FIG. 3 illustrates a power supply system 301 according to an embodiment of the invention. As shown, the adapter 340 may be used with an AC power source 300 or a DC power source 305. In other embodiments, only a DC power source 305 may be utilized to supply power. The AC power source 300 may be coupled to an AC/DC adapter 310 via a cable 342. The DC power source 305 may be coupled to both a DC/DC adapter 315 and comparison circuitry 320 via a cable 345. The DC power source 305 may be an automobile's cigarette lighter outlet or an airplane's EMPOWER system outlet, for example. AC/DC adapter 310 may convert AC power from the AC power source 300 into regulated DC power, which is supplied to post-regulation circuitry 325. The post-regulation circuitry 325 may provide an output voltage ($V_{out}$) and a ground reference (GND) to a tip 330 coupled to the adapter 340 via a cable 350, as further explained below with respect to FIGS. 4A and 4B. The tip 330 may be coupled to an electronic device 335 to provide the power thereto from the power supply system 301. The tip 330 may be removable from the cable 350 and may be inserted into a power input opening of the electronic device. Tips 330 may have different shapes and sizes, depending up the shape and sizes of the power input openings of the respective electronic devices 335 being powered. The tip 330 may also include control circuitry 365 to provide a signal to control circuitry 370 of the adapter 340. The signal may be sent to the control circuitry 370 via the cable 350. In one embodiment, the control circuitry 365 of the tip 330 may include digital components to provide a digital signal to the control circuitry 370 of the adapter 340. The digital signal may be utilized to set the magnitude of $V_{out}$ and limit the amount of current which may be drawn from the adapter 340. The post-regulation circuitry 325 regulates the voltage to what the tip 330 tells it to provide.

Alternatively, the tip 330 may include analog components and may provide voltage programming and current programming voltages ($V_{Vprogram}$ and $V_{Iprogram}$, respectively) to the adapter 340. $V_{Vprogram}$ may be utilized to set the magnitude of $V_{out}$. For example, there may be a linear relationship between $V_{Vprogram}$ and $V_{out}$ where $V_{out}$ is 3 times as large as $V_{Vprogram}$. Accordingly, if $V_{Vprogram}$ had a magnitude of 3.0 Volts, $V_{out}$ would have a magnitude of 9.0 Volts, and if $V_{Vprogram}$ had a magnitude of 2.0 Volts, $V_{out}$ would have a magnitude of 6.0 Volts. The analog circuitry may contain passive or active components.

Alternatively, the tip 330 may include analog components and may provide voltage programming and current programming voltages ($V_{Vprogram}$ and $V_{Iprogram}$, respectively) to the adapter 340. $V_{Vprogram}$ may be utilized to set the magnitude of $V_{out}$. For example, there may be a linear relationship between $V_{Vprogram}$ and $V_{out}$ where $V_{out}$ is 3 times as large as $V_{Vprogram}$. Accordingly, if $V_{Vprogram}$ had a magnitude of 3.0 Volts, $V_{out}$ would have a magnitude of 9.0 Volts, and if $V_{Vprogram}$ had a magnitude of 3.0 Volts, $V_{out}$ would have a magnitude of 6.0 Volts. The analog circuitry may contain passive or active components.

Accordingly, regardless of whether the tip 330 has analog or digital control circuitry, a single adapter 340 may be used to supply power to a plurality of different electronic devices 335 having different power requirements.

The adapter 340 may also include comparison circuitry 320. The comparison circuitry 320 may compare a magnitude of a voltage received from the DC power source 305 with a reference voltage to determine whether the DC power source 305 is an automobile cigarette lighter outlet or an EMPOWER airplane outlet. As stated above, automobile cigarette lighter outlets typically provide a DC voltage having a magnitude within the range of 11.0 Volts and 14.1 Volts. An EMPOWER airplane outlet typically provides a DC voltage having a magnitude within the range of 14.5 and 15.5 Volts. Accordingly, the reference voltage may be set at a level between the high end of the automobile cigarette light outlet voltage (i.e., 14.1 Volts) and the low end of the EMPOWER airplane outlet voltage (i.e., 14.5 Volts). For example, the reference voltage may be set at 14.3 Volts. Accordingly, if the magnitude of the DC power source is greater than 14.3 Volts, then the comparison voltage may determine that the received DC voltage has a greater magnitude than the reference voltage and the DC power source 305 is therefore the EMPOWER airplane outlet. However, if the magnitude of the DC power source is less than 14.3 Volts, then the comparison voltage may determine that the received DC voltage has a smaller magnitude than the reference voltage and the DC power source 305 is therefore the automobile cigarette lighter outlet.

The comparison circuitry 320 may output a signal $V_{data}$ based upon whether the DC power source is determined to be the automobile cigarette lighter outlet or the EMPOWER airplane outlet. For example, the comparison may output 5 Volts if the automobile cigarette lighter outlet is detected, and 0.0 Volts if the EMPOWER airplane outlet is detected. In alternative embodiments, different voltages for $V_{data}$ may be used. In additional embodiments, the comparison circuitry 320 may output a digital signal, such as a stream of bits, indicative of the DC power source 305. $V_{data}$ may be sent via cable 350 to the tip 330, and straight over to the electronic device 335. The electronic device 335 may include a controller 360 which is responsive to $V_{data}$. For example, if the electronic device 335 is a notebook computer and $V_{data}$ is indicative of the EMPOWER airplane outlet system, the controller 360 may disable battery charging circuitry 600, thereby preventing recharging of the batteries. And if the $V_{data}$ is indicative of the automobile cigarette lighter outlet as the DC power source 305, the controller 360 may enabled battery charging circuitry to allow the batteries to be recharged.

Although FIG. 3 illustrates an adapter 340 which includes both a AC/DC adapter and a DC/DC adapter, other embodiments may include only a DC/DC adapter, and no AC/DC adapter.

Figure 4A:
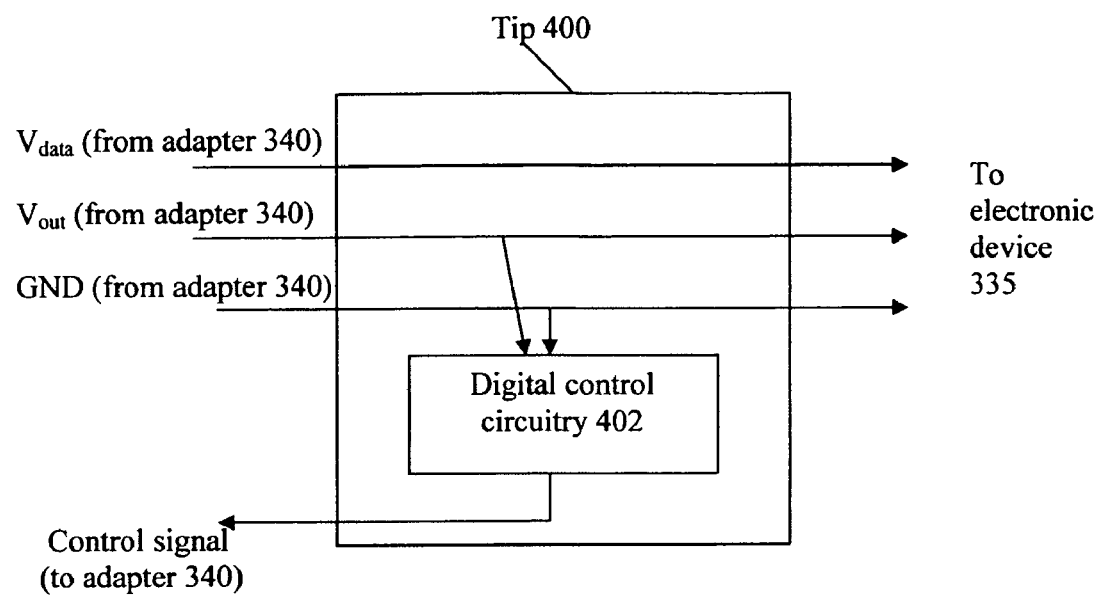
FIG. 4A illustrates a tip having digital control circuitry according to an embodiment of the invention.

FIG. 4A illustrates a tip 400 having digital control circuitry 402 according to an embodiment of the invention. As shown, the tip 400 receives Vdata, Vout and GND from the adapter 340 and allows them to all flow to the electronic device 335. The digital control circuitry 402 may receive the Vout and GND signals and may output a control signal to the adapter 340 to set the magnitude of Vout and limit the current provided. The control signal may be sent to the adapter 340 via the cable 350 between the tip 400 and the adapter 340. The digital control circuitry 402 may include a processor and a memory device, for example. In some embodiments, the tip 400 may be separable from cable 350, and in other embodiments, the tip 400 may be physically part of the cable 350.

Figure 4B:
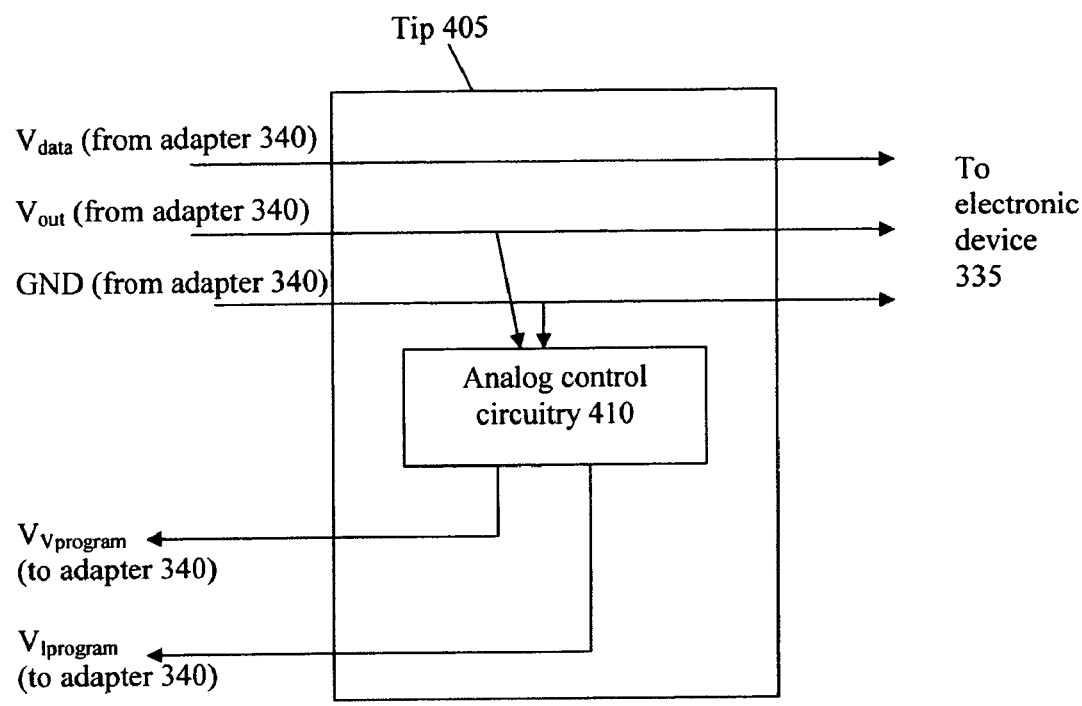
FIG. 4B illustrates a tip having analog control circuitry according to an embodiment of the invention.

FIG. 4B illustrates a tip 405 having analog control circuitry 410 according to an embodiment of the invention. As shown, the tip 405 receives $V_{data}$, $V_{out}$ and GND from the adapter 340 and allows them to all flow to the electronic device 335. The analog control circuitry 410 may receive the $V_{out}$ and GND signals and may output $V_{Vprogram}$ and $V_{Iprogram}$ to the adapter 340. $V_{Vprogram}$ and $V_{Iprogram}$ may be sent to the adapter 340 via the cable 350 between the tip 405 and the adapter 340. The analog control circuitry 400 may include passive or active components, for example. In some embodiments, the tip 400 may be separable from cable 350, and in other embodiments, the tip 400 may be physically part of the cable 350.

Figure 5A:
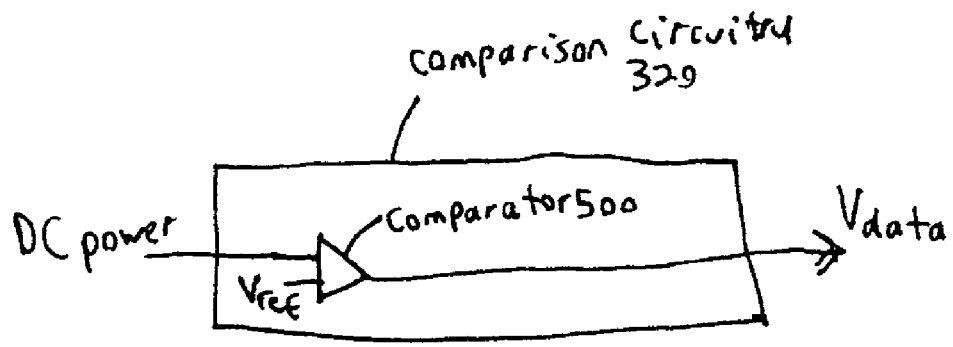
FIG. 5A illustrates comparison circuitry according to an embodiment of the invention.

FIG. 5A illustrates comparison circuitry 320 according to an embodiment of the invention. As shown, the comparison circuitry 320 includes a comparator 500. The comparator 500 receives (a) the DC power signal from the DC power source 305, and (b) a reference voltage, $V_{ref}$. The comparator outputs $V_{data}$ based on whether the magnitude of the DC power from the DC power source exceeds $V_{ref}$ as described above with respect to FIG. 3.

Figure 5B:
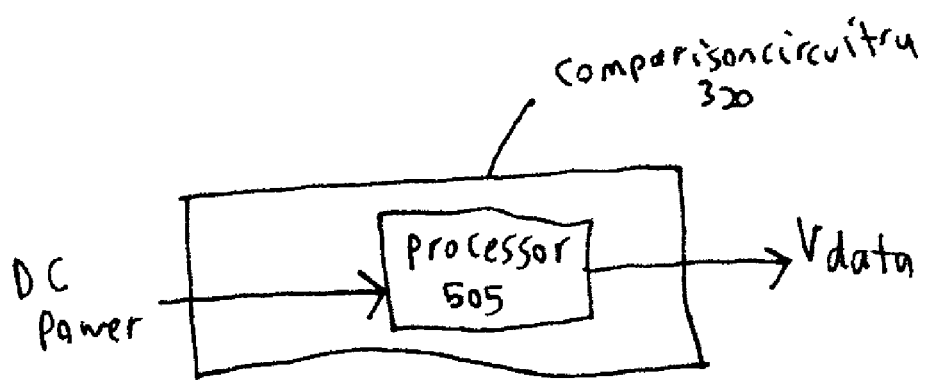
FIG. 5B illustrates comparison circuitry according to an additional embodiment of the invention.

FIG. 5B illustrates comparison circuitry 320 according to an additional embodiment of the invention. As shown, the comparison circuitry 320 includes a processor 505. The processor 505 receives (a) the DC power signal from the DC power source 305, and (b) value of a reference voltage stored in memory. The processor 505 then outputs $V_{data}$ based on whether the magnitude of the DC power from the DC power source exceeds $V_{ref}$ as described above with respect to FIG. 3. The processor 505 may output a single high or low voltage (e.g., 5.0 Volts or 0.0 Volts) based on the detected DC power source. Alternatively, the processor 505 may output a stream of bits to indicate the DC power source.

Figure 6:
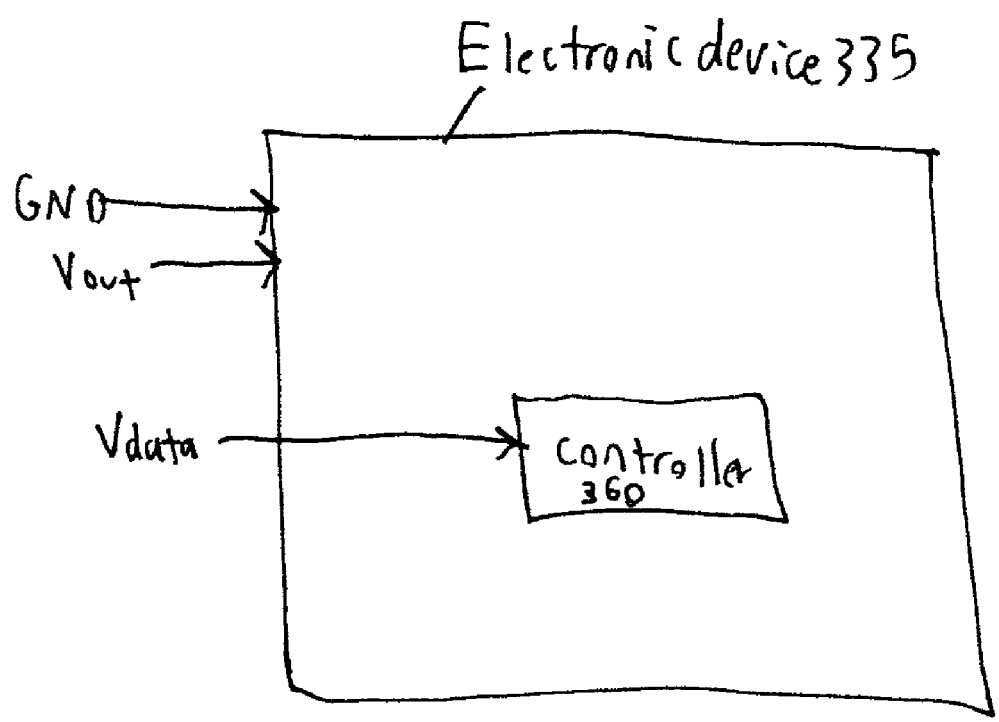
FIG. 6 illustrates an electronic device according to an embodiment of the invention.

FIG. 6 illustrates an electronic device 335 according to an embodiment of the invention. As shown, the electronic device 335 may receive GND, Vout and Vdata from the tip 330. Vdata may be received by a controller 360. The controller 360 may disable battery charging circuitry 600 of the electronic device 335 from charging batteries when Vdata is indicative of the EMPOWER outlet. Alternatively, the controller 360 enable battery charging circuitry 600 so that the batteries of the electronic device may be charged based on the value of Vdata.

Figure 7A:
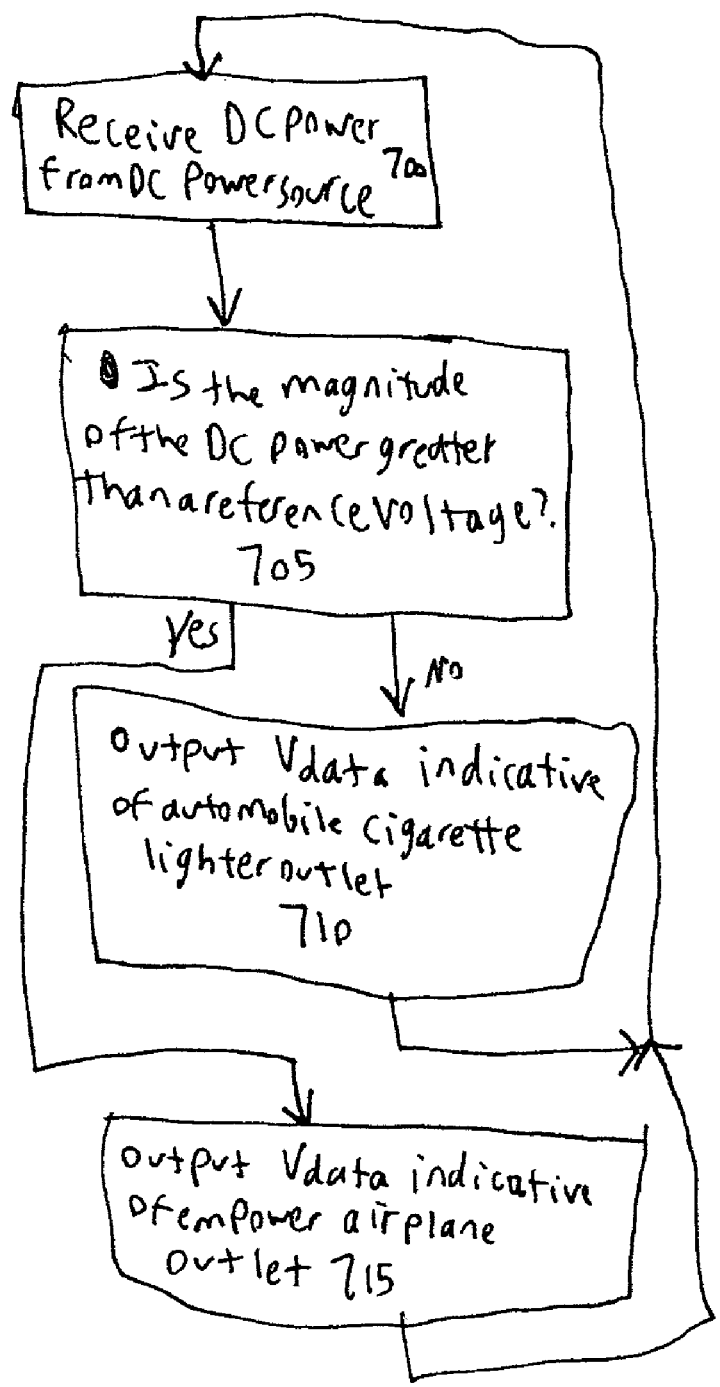
FIG. 7A illustrates a method of determining and outputting $V_{data}$ according to an embodiment of the invention.

FIG. 7A illustrates a method of determining and outputting $V_{data}$ according to an embodiment of the invention. The processing shown in FIG. 7A may be implemented by the adapter 340. First, DC power is received 700 from the DC power source 305. Next, the comparison circuitry determines 705 whether the magnitude of the voltage of the DC power received is greater than $V_{ref}$. If "no," the comparison circuitry determines the DC power source 305 to be an automobile cigarette lighter outlet, and processing proceeds to operation 710, where $V_{data}$ is output with a signal/voltage magnitude indicating that the DC power source 305 is the automobile cigarette lighter outlet. Processing then returns to operation 700. If "yes," at operation 705, processing proceeds to operation 715, where $V_{data}$ is output with a signal/voltage magnitude indicating that the DC power source 305 is the EMPOWER airplane outlet.

Figure 7B:
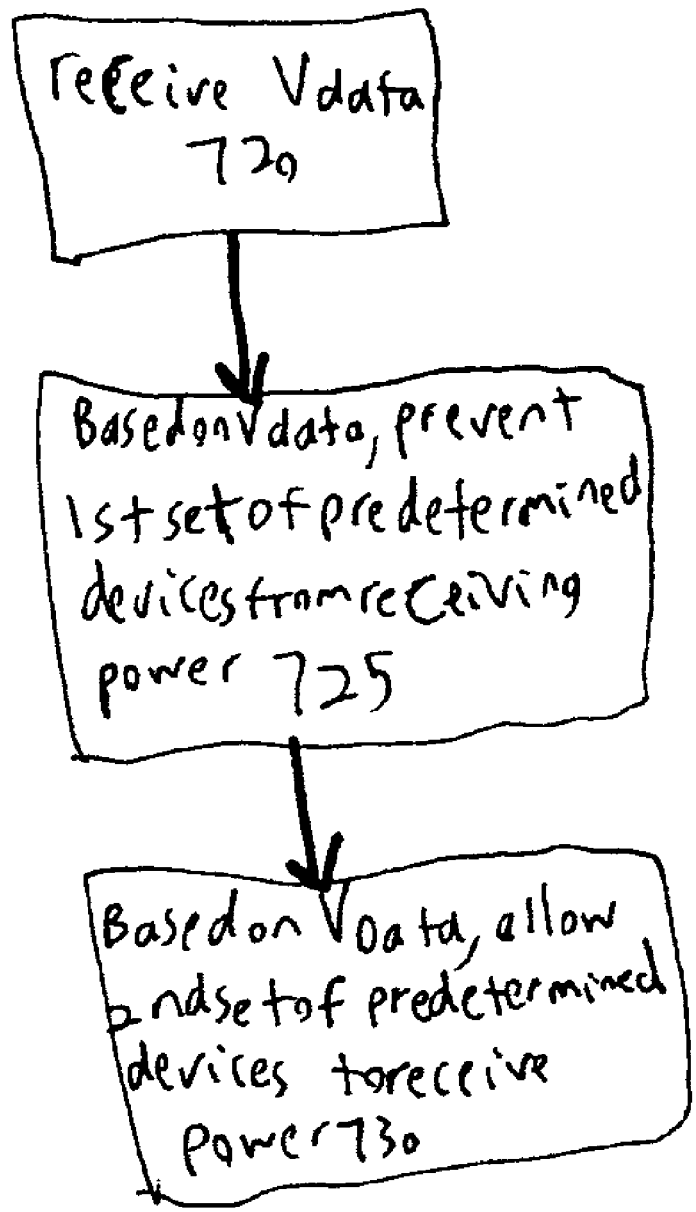
FIG. 7B illustrates a method of receiving $V_{data}$ and allowing power to flow to devices within the electronic device based on $V_{data}$ according to an embodiment of the invention.

FIG. 7B illustrates a method of receiving $V_{data}$ and allowing power to flow to devices within the electronic device 335 based on $V_{data}$ according to an embodiment of the invention. First, the electronic device 335 receives 720 the $V_{data}$ signal. As discussed above, the $V_{data}$ signal is sent from the adapter 340 through the tip 330 and over to the control circuitry 365 of the electronic device 335. Next, based on the $V_{data}$ signal, a first set of predetermined devices may be prevented 725 from receiving power. For example, if the electronic device 335 is a notebook computer, the control circuitry 365 may prevent batteries from recharging if $V_{data}$ indicates that the DC power source is the EMPOWER airplane outlet. Other devices/components in the electronic device 335 may also be prevented from receiving power or from functioning in a certain way.

At operation 730, a second set of predetermined devices may be allowed to receive power based on the Vdata signal. For example, if $V_{data}$ indicates that the DC power source is an automobile cigarette lighter outlet, then power may be available to batteries of the electronic device 335 to allow recharging. Other devices/components in the electronic device 335 may also be allowed to receive power or function in a particular way.

In embodiments described above, the $V_{data}$ signal may be used to send a signal to the control circuitry 365 indicating the DC power source. This signaling may be done via a discrete bit, an analog signal, a data signal line, an analog voltage, or via any other suitable manner. The $V_{data}$ signal may be transmitted from the adapter 340 to the tip 330 and electronic device 335 via a single signaling line or multiple signaling lines.

Figure 8:
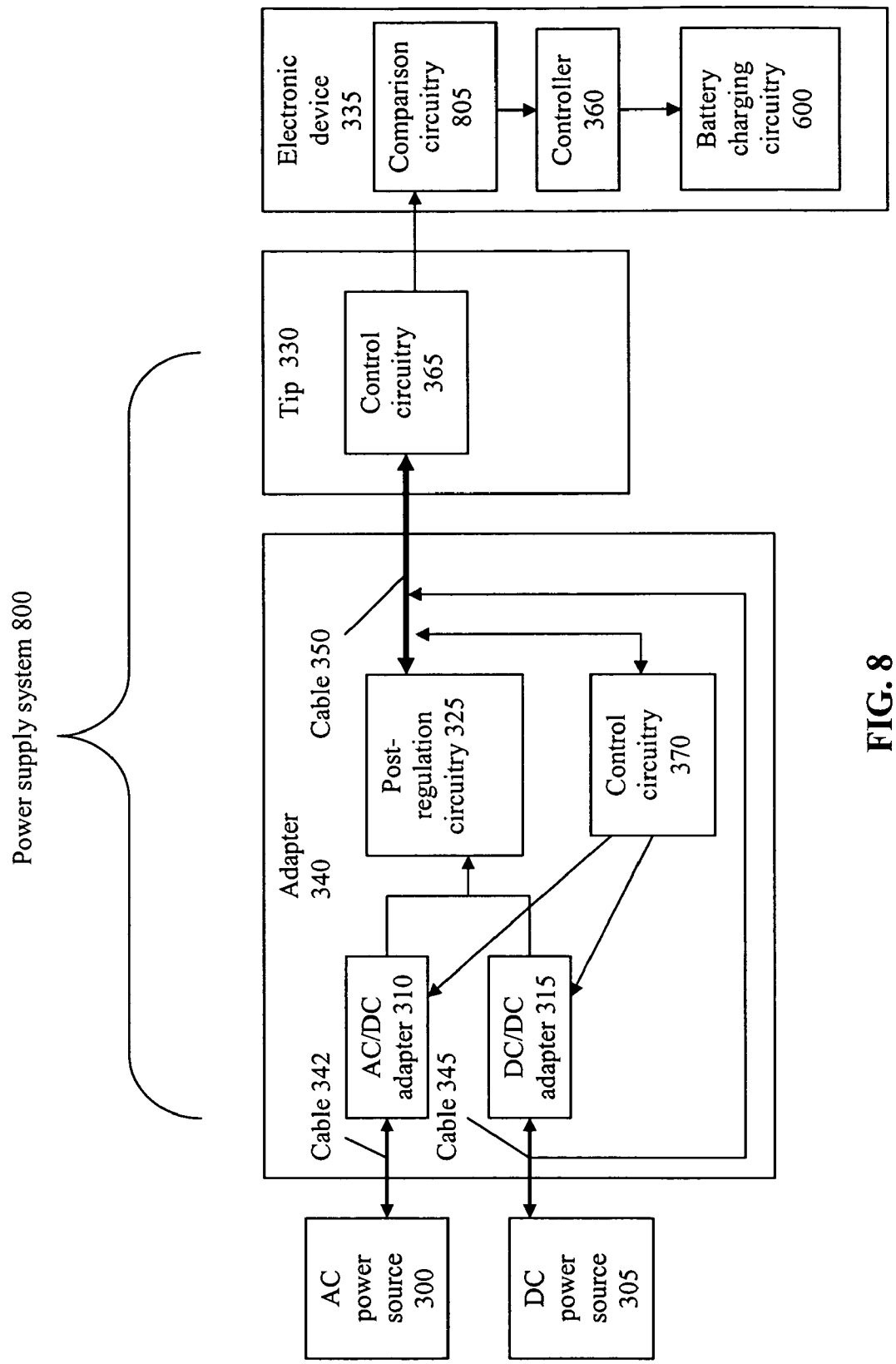
FIG. 8 illustrates a power supply system according to an embodiment of the invention.

FIG. 8 illustrates a power supply system 800 according to an embodiment of the invention. The power supply system 800 is similar to the power supply system 301 shown in FIG. 3. However, unlike the power supply system 301, in which the adapter 340 itself contains comparison circuitry 370, the adapter 340 of power supply system 800 does not contain the comparison circuitry 805. Instead, a regular adapter 340 may be used and the electronic device 335 itself includes the comparison circuitry 805 for determining the DC power source. The electronic device 335 may be a notebook computer and may implement the methods shown in FIGS. 7A and 7B.

Figure 9A:
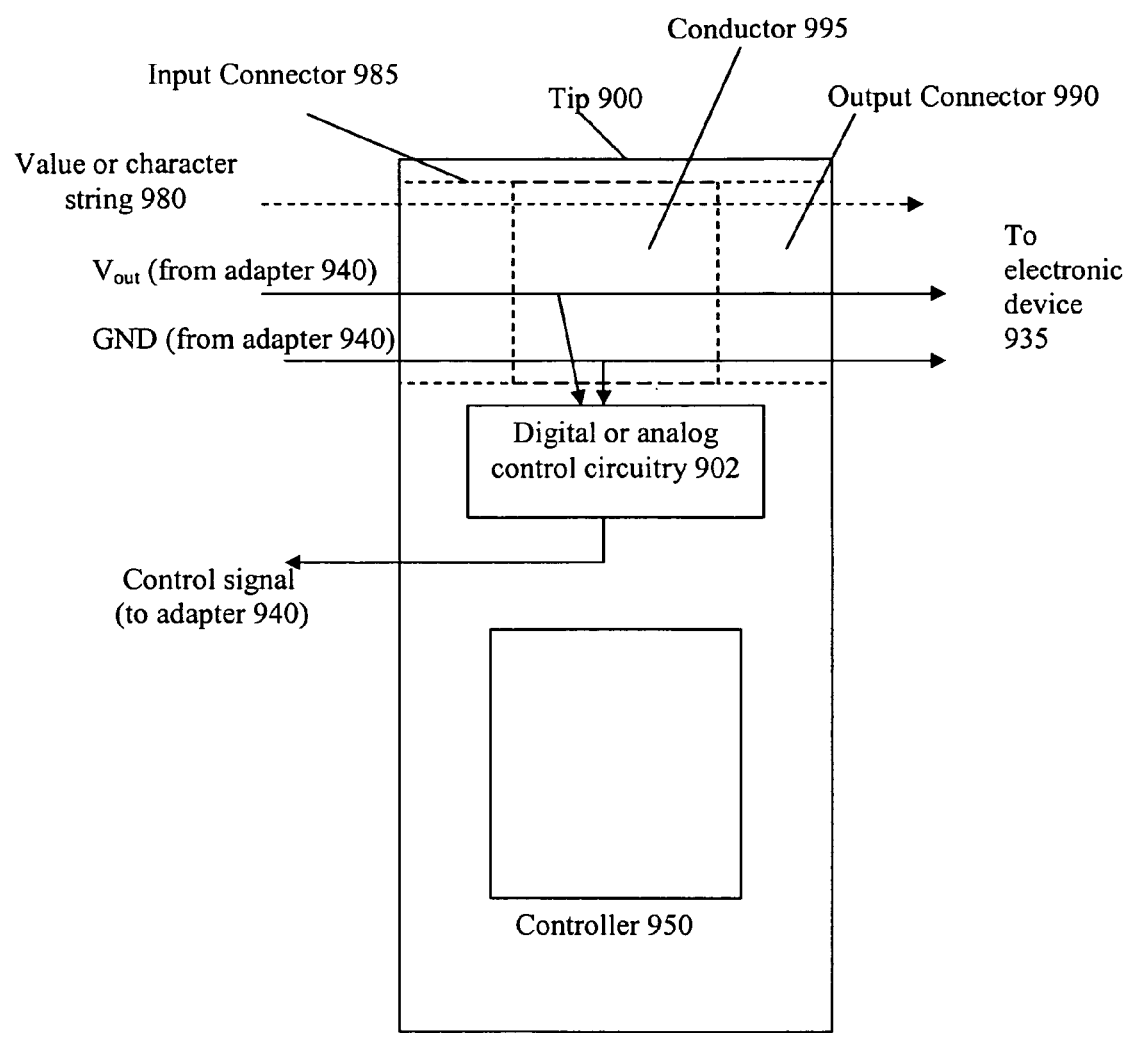
FIGS. 9A and 9B illustrate a tip including control circuitry according to embodiments of the invention.

FIG. 9A illustrates a tip according to an embodiment of the present invention. The tip 900 includes control circuitry 902 and a controller 950. The tip 900 is coupled to an adapter 940 and may have a cable disposed between the adapter 940 and the tip 900. The adapter 940 transmits $V_{out}$ and GND to the tip 900. In an embodiment of the invention, digital or analog control circuitry 902 transmits a programming signal or a control signal to the adapter 940. In an embodiment of the invention, digital or analog control circuitry 902 may transmit a plurality of programming signals to the adapter. Illustratively, digital or analog control circuitry 902 may transmit a voltage control signal to regulate the voltage output (Vout) from the adapter 940. The digital or analog control circuitry 902 may also transmit a current control signal to limit the current output from the adapter 940. The $V_{out}$ and GND signals are passed through the adapter 940 to the electronic device 935, such as a laptop, PDA, or cellular phone, to provide power to the electronic device.

In an embodiment of the invention, the tip 900 may also receive a value, which is illustrated by reference numeral 980 in FIG. 9A. The value may be representative of whether or not the power adapter is an approved adapter which can be connected to an electronic device 935. For example, for safety reasons, certain digital music player or laptop manufactures only desire to have certain manufacturers' power adapter connected to their system. Accordingly, the power adapter may transmit a value that indicates that the power adapter 940 is approved for powering the electronic device. Alternatively, the value may be representative of a maximum power output that is available at the time from the power adapter. For example, the value may represent that only 70 watts of power are available from the power adapter because the power adapter has been limited to that output power. Instead of receiving a value from the power adapter, the tip 900 may receive a character string. The character string may identify whether or not the power adapter is an approved adapter for powering the electronic device 935. The value or the character string may be received at input connector 985 of the tip 900. The input connector 985 may receive the value or character string and may pass through this signal or information to the output connector 990. Under certain operating conditions, there may be no modification of the value or character string in the tip 900. The output connector 990 is coupled to the electronic device 935 and passes the value or character string to the electronic device. A conductor 995 may couple the input connector 985 to the output connector 990.

Figure 9B:
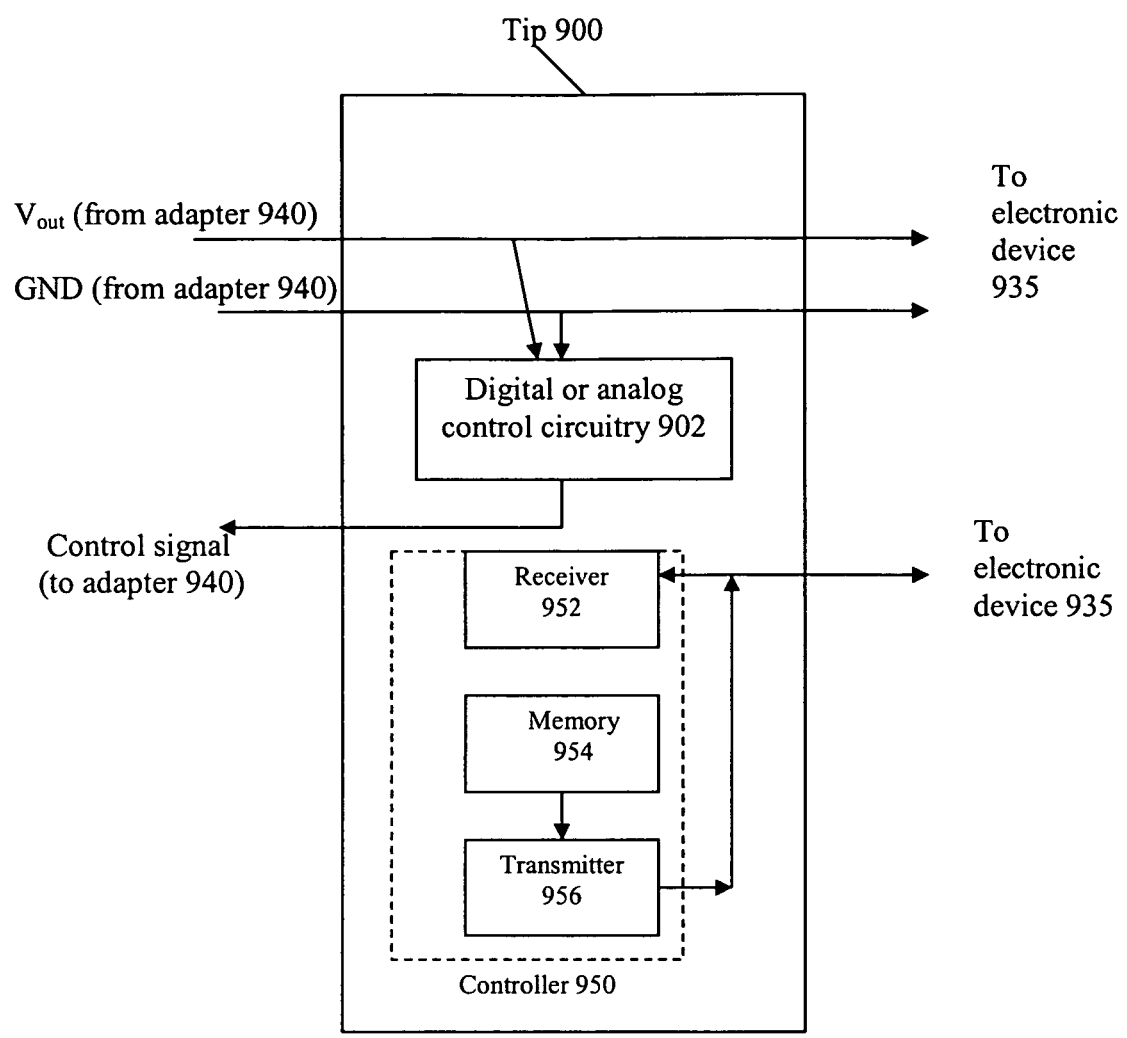

FIG. 9B illustrates an alternative embodiment of a tip according to an embodiment of the invention. In an embodiment of the invention, the tip 900 may include a controller 950, wherein the controller 950 includes a receiver 952, a memory 954, and a transmitter 956. In an alternative embodiment of the invention, a programmable Dallas Semiconductor programmable memory (i.e., DS2502) may be substituted for a controller and may include the receiver 952, memory 954, and transmitter 956. The receiver 952 may receive a signal from the electronic device 935. The signal may be a request from the electronic device 935 to interrogate the tip 900 and identify whether or not an approved power adapter 940 is coupled to the tip 900 and thus the electronic device 935. Once the controller 950 receivers the request from the electronic device 935, the controller 950 extracts a character string from the memory 954 and utilizes the transmitter 956 to transmit the character string to the electronic device 935. The character string is representative of the power adapter to which the tip 900 is coupled. In an embodiment of the invention, a microcontroller may be programmed and could be utilized in place of the transmitter 956, a receiver 952, and a memory 954. The character string may represent that the power adapter 940 and/or tip 900 is approved to be connected to the electronic device, e.g. a laptop or a cellular phone. Under certain operating conditions, the character string represents that a rechargeable battery within the electronic device can be charged by the power adapter 940 and tip 900 combination. Under certain operating conditions, the character string is indicative of a maximum power available from the power adapter. Under certain operating conditions, a value can be stored in the memory 954 where the value is indicative for the maximum power available from the power adapter. Illustratively, the value may be a power (or wattage) value or a current value.

The transmitter 956 may communicate with the electronic device 935 via a one-wire interface. The transmitter 956 may communicate with the electronic device 935 via other communication protocols, including serial communication protocols.

Figure 10:
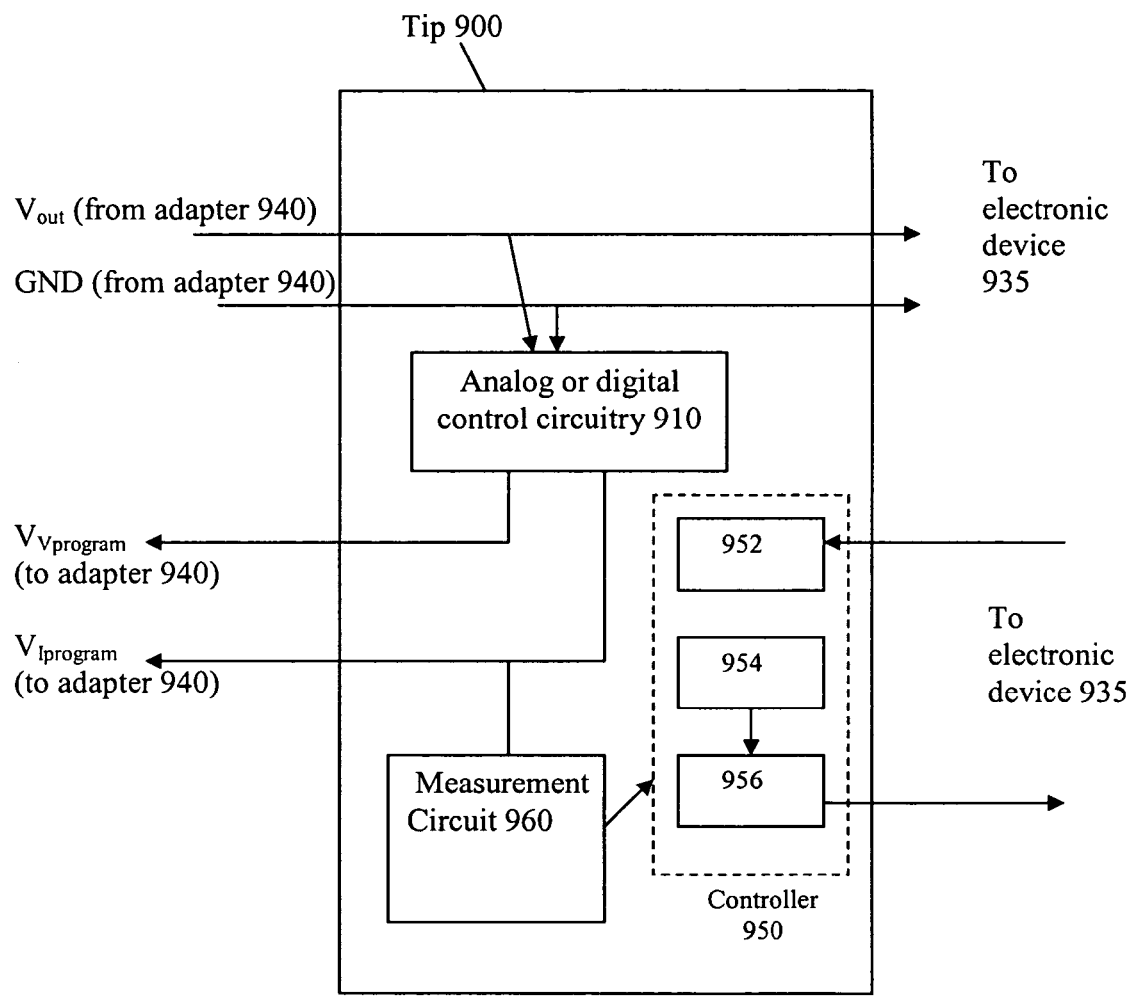
FIG. 10 illustrates a tip including control circuitry and a measurement circuit according to an embodiment of the invention.

FIG. 10 illustrates a second embodiment of a tip according to an embodiment of the invention. The tip 900 may include an analog or digital control circuitry 910, a controller 950, and measurement circuit 960 (e.g., a voltage sense circuit or a current sense circuit). The measurement circuit 960 may measure a magnitude level of a programming or control signal e.g., (VIprogram), that is being transmitted to the power adapter 940. In an embodiment of the invention, the programming or control signal has a value representative of a maximum current available to be output by the adapter 940. For example, a voltage magnitude of the programming or control signal identifies a value of current (e.g., in amperes) that the power adapter is available to output. Illustratively, each 0.5 volts in the programming or control signal may represent one amp of current that the power adapter can output. A programming or control signal having a magnitude of 2.5 volts represents that the power adapter is limited to output 5 amperes and the power output is limited to 100 watts (if the fixed voltage output is 20 volts). The measurement circuit 960 may be implemented using a comparator or a number of comparators that compare a voltage level of the control signal to a reference voltage level or a number of reference voltages.

In an alternative embodiment of the invention, the measurement circuit 960 may be implemented by an analog-to-digital converter. The analog-to-digital converter may measure a value of the control signal or the programming signal and identify the value which is representative of the power available to be output from the power adapter. In an embodiment of the invention, the analog-to-digital converter may be used in conjunction with a microcontroller. The analog-to-digital converter may be separate from the microcontroller or the analog-to-digital converter may be incorporated into the microcontroller.

The measurement circuit 960 takes the measured magnitude level of the programming or control signal and sends the information to the controller 950. A memory 954 may store a plurality of character strings. Alternatively, the memory 954 may store a plurality of values. Each of the plurality of character strings or values may represent a potential power output level of the power adapter 940. For example, one character string may be represent that the power adapter can output 90 watts while another character string represents that the power adapter can output 140 watts. The controller 950 receives the magnitude level of the programming/control signal from the measurement circuit 960 and selects the corresponding character string stored in the memory 954. Alternatively, the controller receives the magnitude level of the programming or control signal and selects the corresponding value stored in the memory 954.

After the corresponding character string or value is selected, the corresponding character string is transmitted to the electronic device 935 through the transmitter 956. The electronic device receives the character string and acts in response to the received character string or value. For example, the character string may indicate that the power adapter coupled to the tip (which is connected to the electronic device) can output 75 watts. Based on this information, a controller in an electronic device 935 (e.g., a laptop) may prevent the power adapter from charging the rechargeable battery within the electronic device 935 because the electronic device 935 may require all of the 75 watts of power.

The controller 950 may be a microcontroller. The controller 950 including the receiver 952, transmitter 956, and memory 954 may be a semiconductor memory chip such as a Dallas Semiconductor DS2502 programmable memory. The receiver 952 and transmitter 956 may communicate with the electronic device via a number of protocols, e.g., the one-wire interface communication protocols, a serial interface communication protocol, etc.

Figure 11:
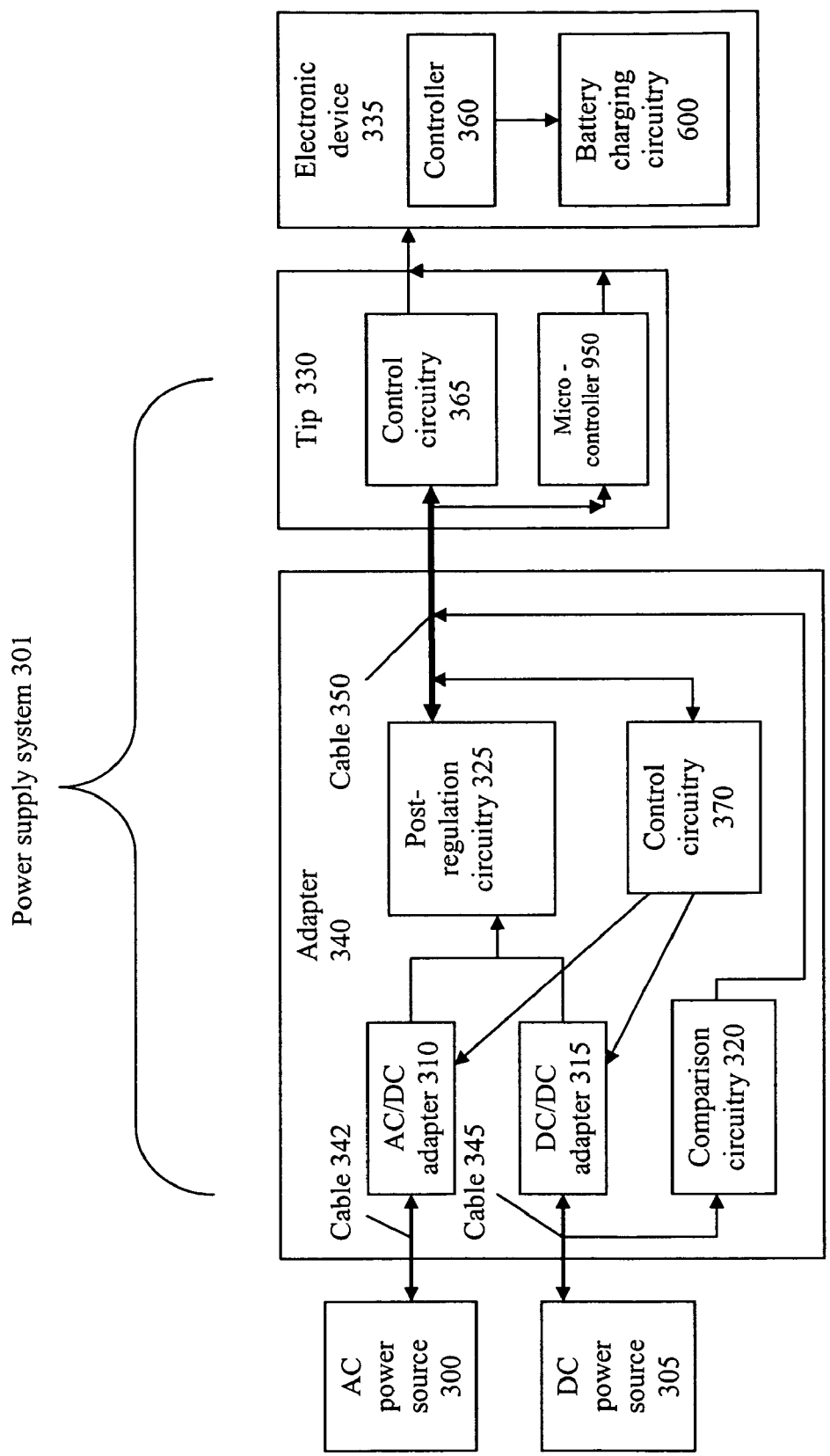
FIG. 11 illustrates a power supply system including a tip according to an embodiment of the invention.

FIG. 11 illustrates an alternative embodiment of a power supply system utilizing DC power source comparison circuitry according to an embodiment of the present invention. FIG. 11 is similar to the power supply system illustrated in FIG. 3 and also includes a microcontroller 950 in the tip 330. In FIG. 11, the microcontroller 950 receives a signal from the power adapter 340 in addition to the $V_{out}$ signal and ground signal. The power source determination signal may be referred to as a $V_{data}$ signal and may be generated by the comparison circuitry 320 in the adapter. The power source determination signal may identify a power capability of the external power source is an external automobile DC power source, an external AC power source, or an external airplane DC power source. For example, the power source determination signal may identify that the power adapter is connected to an external airplane DC power source and is limited to a number of watts of output, e.g., 50 or 60 watts of power. Alternatively, the power source determination signal may identify that the power adapter is connected to an external automobile power source, e.g., 90 watts or 100 watts.

The microcontroller 950 may receive the power source determination signal. Based on the received power source determination signal, the microcontroller 950 may extract a character string corresponding to the received power source determination signal from a memory. The memory 954 (see FIGS. 9A, 9B, and 10), as noted before, may store a number of character strings. Alternatively, the memory 954 may store a number of values and the microcontroller 950 may select one of the number of values. Although FIG. 11 does not illustrate that the microcontroller includes the memory 954, receiver 952, and transmitter 956, the microcontroller 950 may incorporate these components. Alternatively, the memory 954, receiver 952, and transmitter 956 may be located in devices outside of the controller 950 (e.g., not incorporated therein). The number of character strings or values may each represent a different power capability of the power adapters which can be coupled to the tip via a cable. Illustratively, one character string or value may represent a 90 watt power adapter, one character string may represent a 130 watt power adapter, one character string may represent a 70 watt power adapter, and one character string may represent that the power adapter has a limited power supply capability, e.g., less than 70 watts.

In an embodiment of the invention, no character string or value may be transmitted if the power adapter cannot generate a certain wattage of power. This may represent that the power adapter and tip cannot be utilized to charge the battery of the electronic device. The microcontroller 950 may transmit the selected character string to the electronic device. A controller 360 in the electronic device may receive the selected character string and may perform a plurality of actions based on the selected character string. For example, if the selected character string identifies that the power adapter has a limited power capability, e.g., less than 50 watts or 70 watts, the controller 360 may place the electronic device in a mode of low power consumptions, e.g., turning off display earlier or not allowing charging of the battery in the electronic device. Under other operating conditions, the character string or value may identify that an AC adapter is the external power source and can provide 130 Watts, and the controller 360 may allow the battery in the electronic device to be charged by the power adapter and place the electronic device in a high power consumption mode, e.g., brightness of screen and hard drive.

Under certain operating conditions, rather than a character string, the microcontroller 950 may have a number of current levels that represent different power capabilities of adapters. Illustratively, in other words, a first current level may represent that the power adapter 340 can supply 130 watts, a second current level may represent that the power adapter 340 can supply 90 watts, a third current level represents that the power adapter 340 can supply 70 watts, and a fourth current level may represent the power adapter 340 supplies less that 70 watts.

While the description above refers to particular embodiments of the present invention, it will be understood that many modifications may be made without departing from the spirit thereof. The accompanying claims are intended to cover such modifications as would fall within the true scope and spirit of the present invention. The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A system comprising:
   a power supply, which can be selectably coupled to one of a plurality of types of power sources external to the power supply, the power supply including:
      conversion circuitry which converts power received from the power sources to a DC voltage; and
      source determination circuitry which generates a signal indicative of a selected type of the power sources to which the power supply is coupled to receive the power, wherein the DC voltage and the signal are provided as outputs of the power supply; and
   an electronic device, external to the power sources and the power supply, which receives the DC voltage and the signal output by the power supply, the electronic device including a controller for controlling an amount of power drawn from the power supply by the electronic device in response to the signal, wherein the controller controls the amount of power drawn by the electronic device by disabling battery charging circuitry within the electronic device, while the electronic device receives the DC voltage output by the power supply.

2. The system according to claim 1, wherein the electronic device is a portable computer.

3. The system according to claim 1, wherein the power supply can be coupled to an AC power source external to the power supply.

4. The system according to claim 1, wherein the power supply can be coupled to a DC power source external to the power supply.

5. The power supply according to claim 1, wherein the source determination circuitry includes a comparator.

6. The power supply according to claim 1, wherein the source determination circuitry includes a processor.

7. The system according to claim 1, wherein the signal is selected from the group consisting of a transmission of a discrete bit, a transmission of a plurality of bits, an analog signal and an analog voltage.

* * * * *